(12) United States Patent
Kerner et al.

(10) Patent No.: US 11,946,996 B2
(45) Date of Patent: Apr. 2, 2024

(54) ULTRA-ACCURATE OBJECT TRACKING USING RADAR IN MULTI-OBJECT ENVIRONMENT

(71) Applicant: Apple Inc., Cupertino, CA (US)

(72) Inventors: Michael Kerner, Tel Mond (IL); John Zhonghua Wu, San Jose, CA (US); Michael Delishansky, Netanya (IL); Zohar Agon, Tel Aviv (IL); Shachar Shayovitz, Ness Ziona (IL); Michael Ney, Beer Sheva (IL); Shay I. Freundlich, San Jose, CA (US)

(73) Assignee: Apple, Inc., Cupertino, CA (US)

( * ) Notice: Subject to any disclaimer, the term of this patent is extended or adjusted under 35 U.S.C. 154(b) by 290 days.

(21) Appl. No.: 16/917,852

(22) Filed: Jun. 30, 2020

(65) Prior Publication Data
US 2021/0405174 A1    Dec. 30, 2021

(51) Int. Cl.
*G01S 13/28* (2006.01)
*G01S 13/46* (2006.01)
(Continued)

(52) U.S. Cl.
CPC ............ *G01S 13/282* (2013.01); *G01S 13/48* (2013.01); *G06F 3/03545* (2013.01); *G01S 2013/468* (2013.01)

(58) Field of Classification Search
CPC ...... G01S 13/282; G01S 13/48; G01S 13/755; G01S 13/82; G01S 13/878; G01S 2013/468; G06F 3/03545
See application file for complete search history.

(56) References Cited

U.S. PATENT DOCUMENTS

| 4,679,049 A | 7/1987 | Riffiod |
| 5,483,261 A | 1/1996 | Yasutake |

(Continued)

FOREIGN PATENT DOCUMENTS

| CN | 1531706 A | 9/2004 |
| CN | 1659505 A | 8/2005 |

(Continued)

OTHER PUBLICATIONS

Final Office Action received for U.S. Appl. No. 15/650,512, dated Feb. 26, 2019, 27 pages.
(Continued)

*Primary Examiner* — Timothy X Pham
(74) *Attorney, Agent, or Firm* — Kubota & Basol LLP

(57) ABSTRACT

Accuracy for detecting and tracking one or more objects of interest can be improved using radar-based tracking systems. In some examples, multiple radars implemented in a device can be used to transmit signals to, and receive signals from, the one or more objects of interest. To disambiguate an object of interest from undesired objects such as the hand of a user, the object of interest can include a transponder that applies a delay element to a signal received from a radar, and thereafter transmits a delayed return signal back to the radar. The delay produced by the delay element can separate the return signal from undesired reflections and enable disambiguation of those signals. Clear identification of the desired return signal can lead to more accurate object distance determinations, more accurate triangulation, and improved position detection and tracking accuracy.

26 Claims, 9 Drawing Sheets

(51) Int. Cl.
G01S 13/48 (2006.01)
G06F 3/0354 (2013.01)

(56) References Cited

U.S. PATENT DOCUMENTS

| | | | |
|---|---|---|---|
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,212,296 | B1 | 4/2001 | Stork et al. |
| 6,310,610 | B1 | 10/2001 | Beaton et al. |
| 6,323,846 | B1 | 11/2001 | Westerman et al. |
| 6,348,914 | B1 | 2/2002 | Tuli |
| 6,441,807 | B1 | 8/2002 | Yamaguchi |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,268,774 | B2 | 9/2007 | Pittel et al. |
| 7,646,379 | B1 | 1/2010 | Drennan et al. |
| 7,663,607 | B2 | 2/2010 | Hotelling et al. |
| 7,852,318 | B2 | 12/2010 | Altman |
| 7,880,726 | B2 | 2/2011 | Nakadaira et al. |
| 8,194,921 | B2 | 6/2012 | Kongqiao et al. |
| 8,456,419 | B2 | 6/2013 | Wilson |
| 8,479,122 | B2 | 7/2013 | Hotelling et al. |
| 8,624,859 | B2 | 1/2014 | Aono |
| 8,922,530 | B2 | 12/2014 | Pance |
| 9,213,890 | B2 | 12/2015 | Huang et al. |
| 9,262,033 | B2 | 2/2016 | Idzik et al. |
| 9,285,900 | B2 | 3/2016 | Rhee |
| 9,733,731 | B2 | 8/2017 | Bakken et al. |
| 9,880,629 | B2 | 1/2018 | Moscarillo |
| 10,019,079 | B2 | 7/2018 | Peretz et al. |
| 10,481,718 | B2 | 11/2019 | Ding et al. |
| 2004/0150631 | A1 | 8/2004 | Fleck et al. |
| 2004/0189620 | A1 | 9/2004 | Roh et al. |
| 2004/0239702 | A1 | 12/2004 | Kang et al. |
| 2005/0094750 | A1* | 5/2005 | Park .................. H04N 5/38 375/350 |
| 2005/0150697 | A1 | 7/2005 | Altman et al. |
| 2006/0197753 | A1 | 9/2006 | Hotelling |
| 2007/0003168 | A1 | 1/2007 | Oliver |
| 2007/0107744 | A1 | 5/2007 | Dilbeck et al. |
| 2008/0018591 | A1 | 1/2008 | Pittel et al. |
| 2008/0169132 | A1 | 7/2008 | Ding et al. |
| 2010/0013700 | A1* | 1/2010 | Chiassarini ............. G01S 13/90 342/25 F |
| 2012/0069168 | A1 | 3/2012 | Huang et al. |
| 2012/0256777 | A1 | 10/2012 | Smith et al. |
| 2012/0280900 | A1 | 11/2012 | Wang et al. |
| 2012/0280948 | A1 | 11/2012 | Barrus et al. |
| 2013/0265218 | A1 | 10/2013 | Moscarillo |
| 2014/0300509 | A1* | 10/2014 | Choi .................. G01S 7/4056 342/200 |
| 2014/0324888 | A1 | 10/2014 | Xie et al. |
| 2014/0327658 | A1 | 11/2014 | Vardi |
| 2015/0035697 | A1* | 2/2015 | Cho .................. G01S 13/931 342/172 |
| 2015/0160851 | A1 | 6/2015 | Michihata et al. |
| 2015/0177842 | A1 | 6/2015 | Rudenko |
| 2015/0253193 | A1 | 9/2015 | Schilz et al. |
| 2015/0277569 | A1 | 10/2015 | Sprenger et al. |
| 2016/0092728 | A1 | 3/2016 | Tsutsui |
| 2017/0060254 | A1 | 3/2017 | Molchanov et al. |
| 2017/0097413 | A1 | 4/2017 | Gillian et al. |
| 2017/0309057 | A1 | 10/2017 | Vaganov |
| 2017/0358144 | A1 | 12/2017 | Schwarz et al. |
| 2018/0018057 | A1 | 1/2018 | Bushnell et al. |
| 2018/0306913 | A1* | 10/2018 | Bartels .................. G01S 15/74 |
| 2018/0358997 | A1* | 12/2018 | Shekhar .................. H04B 1/525 |
| 2021/0103031 | A1 | 4/2021 | Cohen et al. |

FOREIGN PATENT DOCUMENTS

| | | |
|---|---|---|
| CN | 103353793 A | 10/2013 |
| CN | 103502911 A | 1/2014 |
| CN | 103995998 A | 8/2014 |
| CN | 104392160 A | 3/2015 |
| CN | 105378585 A | 3/2016 |
| CN | 103098076 B | 6/2016 |
| CN | 105829920 A | 8/2016 |
| CN | 106372583 A | 2/2017 |
| CN | 106571918 A | 4/2017 |
| EP | 0104401 A2 | 4/1984 |
| EP | 0355336 B1 | 8/1995 |
| EP | 2416172 A2 | 2/2012 |
| JP | 2000-163031 A | 6/2000 |
| JP | 2002-342033 A | 11/2002 |
| WO | 2002/039421 A1 | 5/2002 |
| WO | 2002/097721 A2 | 12/2002 |

OTHER PUBLICATIONS

First Action Interview received for U.S. Appl. No. 15/650,512, dated Dec. 3, 2018, 5 pages.
Non-Final Office Action received for U.S. Appl. No. 15/650,512, dated Aug. 29, 2019, 5 pages.
Notice of Allowance received for U.S. Appl. No. 15/650,512, dated Jan. 21, 2020, 9 pages.
Preinterview First Office Action received for U.S. Appl. No. 15/650,512, dated Sep. 17, 2018, 5 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 16/500,230, dated Jun. 16, 2022, 23 Pages.
International Search Report received for PCT Patent Application No. PCT/US2018/039715, dated Sep. 13, 2018, 3 pages.
International Search Report received for PCT Patent Application No. PCT/US2021/038993, dated Oct. 4, 2021, 5 pages.
Non-Final Office Action received for U.S. Appl. No. 16/500,230, dated Dec. 7, 2021, 28 pages.
Bouhlel et al., "Non-Linear Effect Mitigation for FMCW Radar System", 15th European Radar Conference (EURAD), European Microwave Association, Sep. 26, 2018, pp. 301-304.
Nieuwland et al., "Vehicle Safety Improvement: Active Transponder", IP.com, IP.com Inc., West Henrietta, NY, US, Jan. 27, 2012, 4 pages.
Ringel, Uwi. "Medical Imaging Radar," Siemens AG, The ip.com Journal, Mar. 25, 2006 (9 pages with cover page and English Machine Translation of the Abstract retrieved from: https://priorart.ip.com/IPCOM/000133969).
Search Report received for Chinese Patent Application No. 201880055035.1, dated Mar. 3, 2023, 6 pages (3 pages of English Translation and 3 Pages of Official Copy).
Search Report received for Chinese Patent Application No. 201880055035.1, dated Sep. 1, 2023, 2 pages (2 pages of English Translations only).

\* cited by examiner

ULTRA-ACCURATE OBJECT TRACKING USING RADAR IN MULTI-OBJECT ENVIRONMENT

FIELD OF THE DISCLOSURE

This relates generally to object sensing systems, and more particularly, to detecting and tracking one or more objects such as styluses using radar.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some capacitive touch sensing systems, a physical touch on the display is not needed to detect a touch, and objects approaching near the surface may be detected near the surface without actually touching the surface.

However, proximity sensing systems (systems that can detect both touching and hovering objects) often require an array of sensors across a large surface area to enable object detection, and when proximity sensing arrays are placed over displays, image quality of the display can suffer. Furthermore, the object detection range of proximity sensing systems is often limited, and the position and motion sensing resolution of these systems is often limited by the number and size of sensing elements in the array. Because of these limitations, alternative systems such as ultrasonic sensing systems and radar sensing systems have been developed that use triangulation to detect objects. However, when the object (e.g., a stylus) requires very accurate position detection with sub-millimeter accuracy, for example, even these systems can suffer from inadequate position detection accuracy.

SUMMARY

This relates to detecting and tracking one or more objects of interest (e.g., one or more styluses, fingertips of a glove) with improved accuracy using radar-based tracking systems. In some examples, multiple radars implemented in a device (e.g., a computer, tablet, etc.) can be used to transmit signals to, and receive signals from, the one or more objects of interest. A device, as that term is used herein, includes but is not limited to portable and handheld electronic devices, small standalone units in communication with other electronics whose main function is to provide radar functionality at remote locations, stationary electronic devices, and larger environment devices such as a smart room or a smart whiteboard, for example. To disambiguate an object of interest from undesired objects such as the hand of a user holding the object of interest, the object of interest can include a transponder that applies a delay element to, or otherwise processes, a signal received from a radar, and thereafter transmits a return signal back to the radar. In examples that utilize delay elements, as that term is defined herein, the delay produced by the delay element can separate the return signal from the reflections of other sources (e.g., the hand, etc.) and enable disambiguation of the desired return signal from undesired reflections. In examples that process the signal received from the radar, the object of interest match filters the received signal, and if a match is confirmed, transmits a unique return signal back to the radar that can be matched and correlated to filter out undesired reflections. Clear identification of the desired return signal can lead to more accurate object distance determinations, more accurate triangulation, and ultimately improved position detection and tracking accuracy.

In some examples, the delay element referred to above can be implemented in the object of interest using an analog delay (e.g., an electrical length of a cable) or a digital delay (e.g., an analog-to-digital converter (ADC), digital logic, and a digital-to-analog converter (DAC)) to delay a frequency-modulated (FM) signal received from a radar. In some examples, the FM signal can be a frequency-modulated continuous wave (FMCW) signal. In other examples that utilize FMCW signals, the delay element can be implemented using a carrier shift, with the frequency difference representing the desired delay. For example, the object of interest can include two phase-locked-loops (PLLs) or other frequency sources separated in frequency by the carrier shift. The received FMCW signal can be downconverted, upconverted and transmitted back to the radar with the desired carrier shift. Radar processing circuitry can utilize the carrier shift between transmitted and received signals and known characteristics of the FMCW signal to determine the distance between the radar and the object of interest. Triangulation techniques can then be employed using distance data from multiple radars to determine object location with high accuracy. In some examples, accuracy of 100 micrometers or better can be achieved.

Radar-based object tracking systems such as those described above can enable two-dimensional or three-dimensional object position and gesture determinations of an object of interest moving on a surface or in free space. In addition, if multiple objects of interest employ delay elements with unique delays, multiple objects of interest can be simultaneously tracked by the plurality of radars in the object tracking system, allowing for improved collaborative experiences. For example, such systems can allow multiple users in the same meeting room, each having a stylus, to collectively edit, draw or otherwise contribute ideas to a shared document being created or displayed on a device such as a smart board or smart display. In another example, wearable devices such as gloves outfitted with a delay element on one or more fingertips can provide one or more objects of interest (each fingertip with a delay element being an object of interest) for performing gestures.

DETAILED DESCRIPTION

Figure 1A:
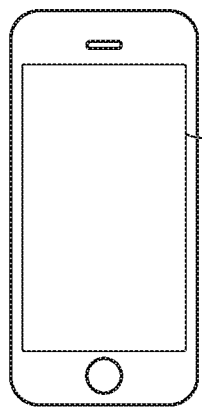
FIGS. 1A-1H illustrate electronic devices that can be utilized within radar-based object tracking systems for performing accurate object tracking according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to detecting and tracking one or more objects of interest (e.g., one or more styluses, fingertips of a glove) with improved accuracy using radar-based tracking systems. In some examples, multiple radars implemented in a device (e.g., a computer, tablet, etc.) can be used to transmit signals to, and receive signals from, the one or more objects of interest. A device, as that term is used herein, includes but is not limited to portable and handheld electronic devices, small standalone units in communication with other electronics whose main function is to provide radar functionality at remote locations, stationary electronic devices, and larger environment devices such as a smart room or a smart whiteboard, for example. To disambiguate an object of interest from undesired objects such as the hand of a user holding the object of interest, the object of interest can include a transponder that applies a delay element to, or otherwise processes, a signal received from a radar, and thereafter transmits a return signal back to the radar. As used herein, the term "transponder" includes a device (e.g., a repeater) that re-transmits the same signal it received, optionally with a time delay, or a device that receives one signal and transmits another signal, where the received and transmitted signals need not be the same signals or related signals (e.g., the transmitted signal may not be the same signal as, or a modified version of, the received signal). Also, as used herein, the term "delay element" includes elements that produce an actual delay of the same signal (e.g., an electrical length of a cable) or elements that produce an effective delay (e.g., a frequency shifted signal). In examples that utilize delay elements, the delay produced by the delay element can separate the return signal from the reflections of other sources (e.g., the hand, etc.) and enable disambiguation of the desired return signal from undesired reflections. In examples that process the signal received from the radar, the object of interest match filters the received signal, and if a match is confirmed, transmits a unique return signal back to the radar that can be matched and correlated to filter out undesired reflections. Clear identification of the desired return signal can lead to more accurate object distance determinations, more accurate triangulation, and ultimately improved position detection and tracking accuracy.

In some examples, the delay element can be implemented in the object of interest using an analog delay (e.g., an electrical length of a cable) or a digital delay (e.g., an ADC, digital logic, and a DAC) to delay an FM signal received from a radar. In some examples, the FM signal can be a FMCW signal. (As used herein, the acronym "FM" is used to represent either FM or FMCW signals unless otherwise indicated.) In other examples that utilize FMCW signals, the delay element can be implemented using a carrier shift, with the frequency difference representing the desired delay. For example, the object of interest can include two PLLs or other frequency sources separated in frequency by the carrier shift. The received FMCW signal can be downconverted, upconverted and transmitted back to the radar with the desired carrier shift. Radar processing circuitry can utilize the carrier shift between transmitted and received signals and known characteristics of the FMCW signal to determine the distance between the radar and the object of interest. Triangulation techniques can then be employed using distance data from multiple radars to determine object location with high accuracy. In some examples, accuracy of 100 micrometers or better can be achieved.

Radar-based object tracking systems such as those described above can enable two-dimensional or three-dimensional object position and gesture determinations of an object of interest moving on a surface or in free space. In addition, if multiple objects of interest employ transponders including delay elements with unique delays, multiple objects of interest can be simultaneously tracked by the plurality of radars in the object tracking system, allowing for improved collaborative experiences. For example, such systems can allow multiple users in the same meeting room, each having a stylus, to collectively edit, draw or otherwise contribute ideas to a shared document being created or displayed on a device such as a smart board or smart display. In another example, wearable devices such as gloves outfitted with a delay element on one or more fingertips can provide one or more objects of interest (each fingertip with a delay element being an object of interest) for performing gestures.

Figure 1B:
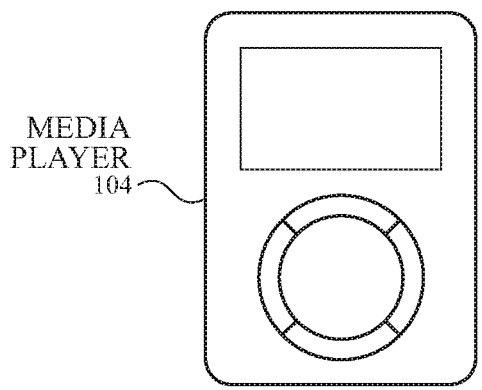
Figure 1C:
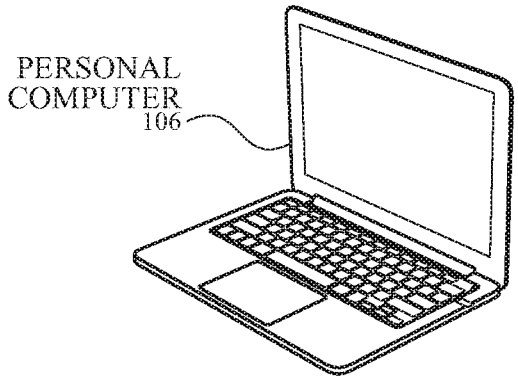
Figure 1D:
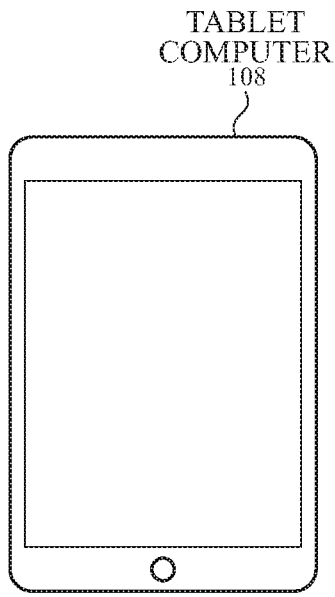
Figure 1E:
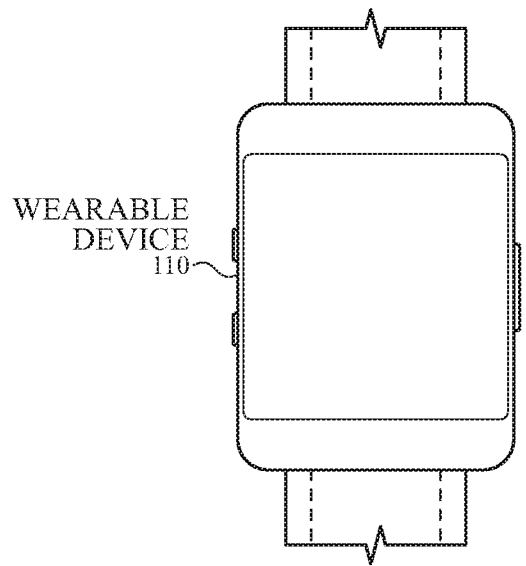
Figure 1F:
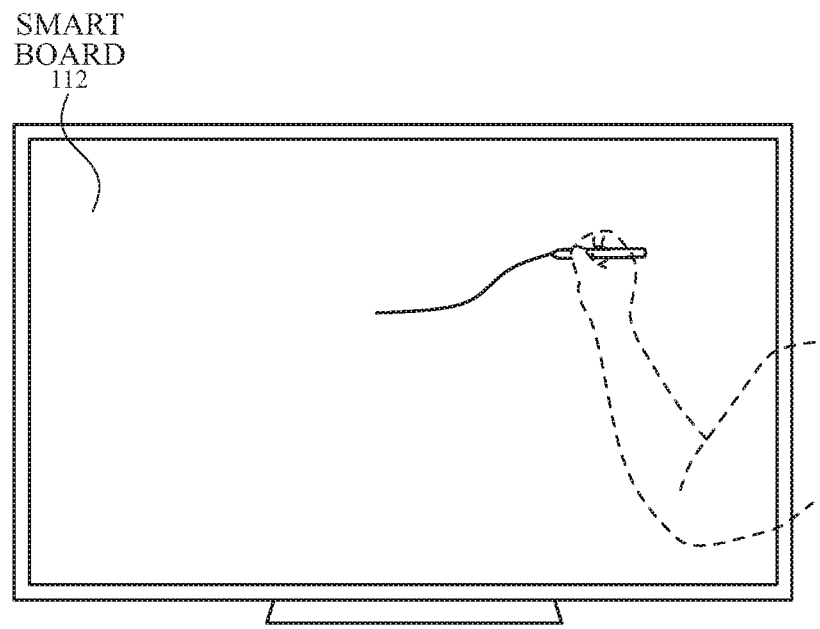
Figure 1G:
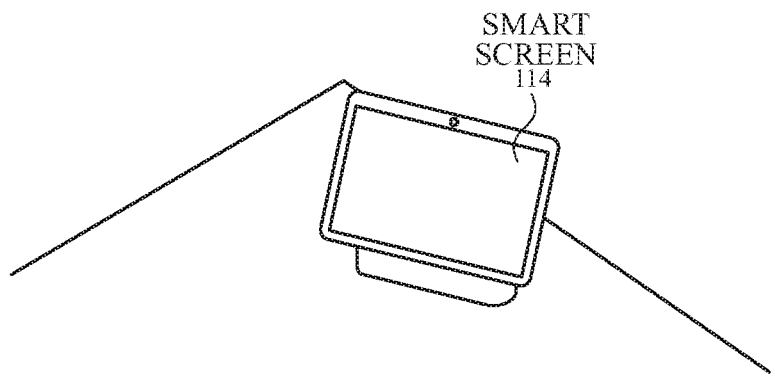
Figure 1H:
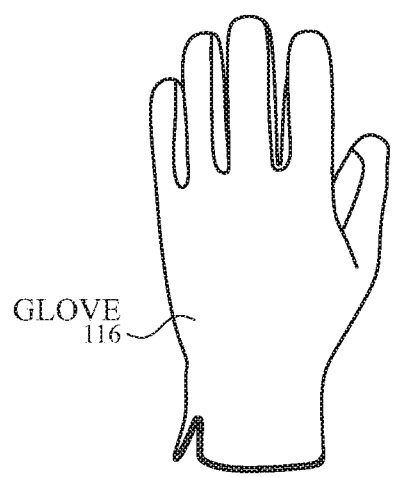

FIGS. 1A-1H illustrate electronic devices that can be utilized within radar-based object tracking systems for performing accurate object tracking according to examples of the disclosure. FIG. 1A illustrates exemplary mobile telephone 102 that can be utilized within a radar-based object tracking system according to examples of the disclosure. FIG. 1B illustrates example digital media player 104 that can be utilized within a radar-based object tracking system according to examples of the disclosure. FIG. 1C illustrates example personal computer 106 that can be utilized within a radar-based object tracking system according to examples of the disclosure. FIG. 1D illustrates example tablet computing device 108 that can be utilized within a radar-based object tracking system according to examples of the disclosure. FIG. 1E illustrates example wearable device 110 (e.g., a watch) that can be utilized within a radar-based object tracking system according to examples of the disclosure. FIG. 1F illustrates example smartboard 112 (e.g., an interactive whiteboard) that can be utilized within a radar-based object tracking system according to examples of the disclosure. FIG. 1G illustrates example smart screen 114 (e.g., an interactive video screen) that can be utilized within a radar-based object tracking system according to examples of the disclosure. FIG. 1H illustrates example glove 116 that can be utilized within a radar-based object tracking system according to examples of the disclosure. It should be understood that the example devices illustrated in FIGS. 1A-1H are provided as examples, and other types of devices can be utilized within a radar-based object tracking system for tracking movement of an object according to examples of the disclosure.

The above-described devices can be utilized within a radar-based object tracking system to add object tracking capabilities to the device. Using FIG. 1C as an example, a laptop computer 106 incorporated within a radar-based object tracking system can provide object tracking capability in two dimensions for an object of interest such as a stylus moving across its touch screen, trackpad or keyboard. In other examples, the radar-based object tracking system can also provide object tracking capability in three dimensions for an object of interest such as a stylus moving in space above or beyond the laptop's touch screen, trackpad or keyboard. In still other examples, the radar-based object tracking system can also provide object tracking capability in three dimensions for multiple objects such as multiple styluses moving in space above or beyond the laptop's touch screen, trackpad or keyboard. In one particular example, a computing device can be configured for displaying or capturing an image for a group of people in a conference room, and each of those people can simultaneously use their own stylus to perform gestures on a tabletop or in space, or on a smart board or screen to draw or otherwise provide input or gestures that then appear on the image being displayed or captured.

Figure 2:
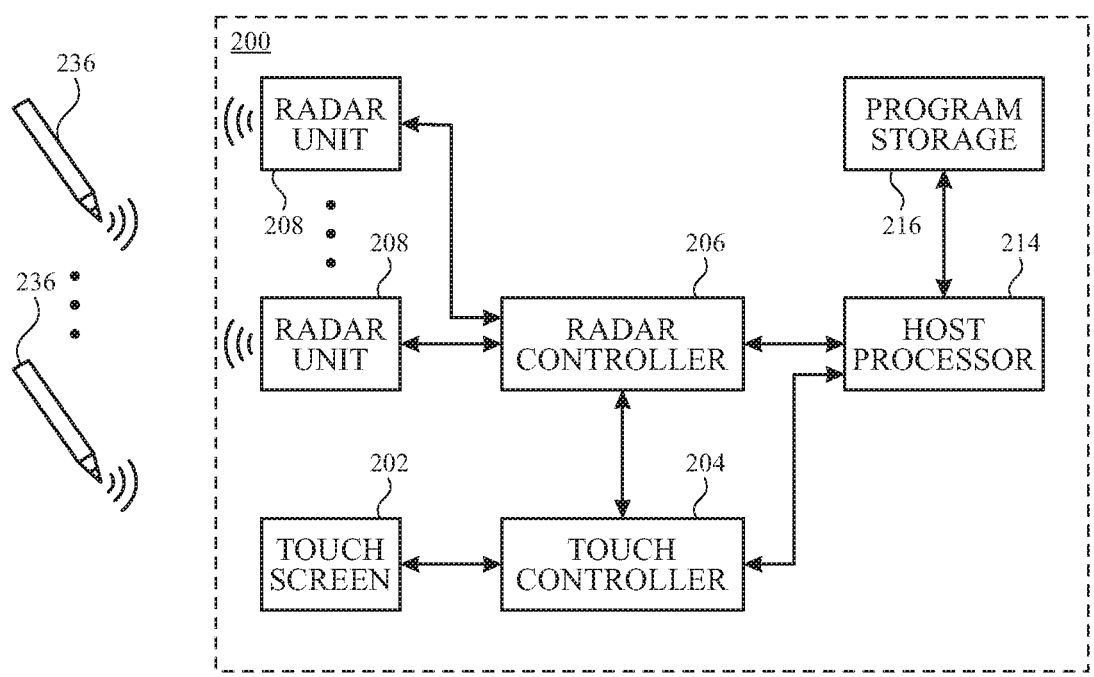
FIG. 2 illustrates an exemplary block diagram of a radar-based object tracking system according to examples of the disclosure.

FIG. 2 illustrates an exemplary block diagram of a radar-based object tracking system according to examples of the disclosure. In some examples, the radar-based object tracking system can include device 200 (e.g., corresponding to devices 102, 104, 106, 108 and 110 above) and one or more styluses 236. Device 200 can include a plurality of radar units 208, host processor 214, and program storage 216. In some examples, device 200 can optionally include one or more of radar controller 206, touch controller 204, and touch screen 202. Although FIG. 2 illustrates host processor 214, touch controller 204, and radar controller 206 as separate functional blocks, in some examples two or more of these blocks may physically reside in the same controller, processor or chip. It should be emphasized that FIG. 2 is only an example high-level representation, and that fewer, more or different functional blocks may be included in device 200.

In some examples, host processor 214 can communicate with radar controller 206 and optionally touch controller 204 to initiate or perform actions based on those communications. Radar controller 206 can control the operation of multiple radar units 208, perform processing on the data provided by the radar units, and can further transmit object tracking signals to host processor 214 for further processing and operations. Touch controller 204 can provide stimulation signals to the touch screen and can receive and process touch signals from the touch screen, and can further transmit touch signals to host processor 214 for further processing and operations. Host processor 214 can be connected to program storage 216 and a display controller (not shown) to generate images on touch screen 202. Program storage 216 can include, but are not limited to, random access memory (RAM) or other types of memory or storage, watchdog timers and the like.

In some examples, host processor 214 can receive object tracking information and/or touch information to identify free-space gestures, two-dimensional gestures, touch gestures, commands, and the like. The object tracking and/or touch information can be used by computer programs stored in program storage 216 to perform or initiate actions that can include, but are not limited to, moving an object such as a cursor or pointer, scrolling or panning, adjusting control settings, opening a file or document, viewing a menu, making a selection, executing instructions, operating a drawing program, and the like. Host processor 214 can also perform additional functions that may not be related to touch processing.

Note that one or more of the program-controlled functions described herein can be performed by firmware stored in program storage 216 and executed by host processor 214 or other processors. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3:
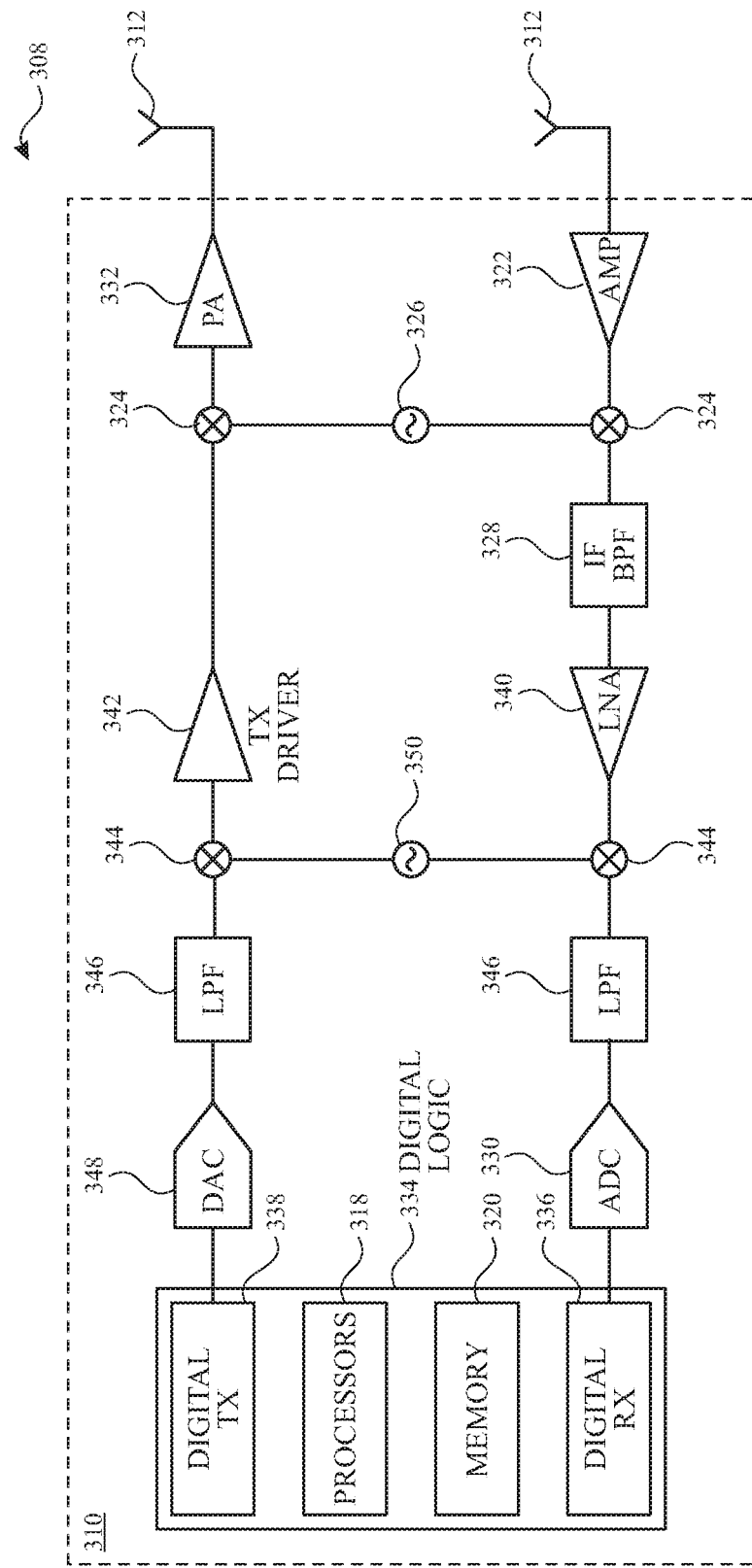
FIG. 3 illustrates a block diagram of a radar unit according to examples of the disclosure.

FIG. 3 illustrates a block diagram of FM radar unit 308 according to examples of the disclosure. Radar unit 308 can include a radar integrated circuit (IC) 310, antennas 312, and other components. In some examples, radar IC 310 can include digital logic 334 such as one or more processors 318, memory 320, digital receive logic 336 and digital transmit logic 338. In some examples, radar IC 310 can include analog circuitry such as amplifier 322 for receiving reflected or otherwise returned signals, RF mixers 324, RF PLL or frequency source 326, intermediate frequency (IF) bandpass filter 328, low noise amplifier 340, transmit driver 342, IF mixers 344, IF PLL or frequency source 350, low pass filters 346, ADC 330, DAC 348, and power amplifier 332 for transmitting signals. Radar IC 310 can enable sensing of the location of objects such as a stylus, and the motion of that object. In some examples, radar IC 130 can be an FM (but not continuous wave) radar. In other examples, radar IC 310 can be a FMCW radar operating between 3 GHz and 150 GHz. In some examples, radar IC 310 can be a 60 GHz FMCW radar. It should be emphasized that FIG. 3 is only an example high-level representation, and that fewer, more or different components and functional blocks may be included in radar unit 308.

Figure 4:
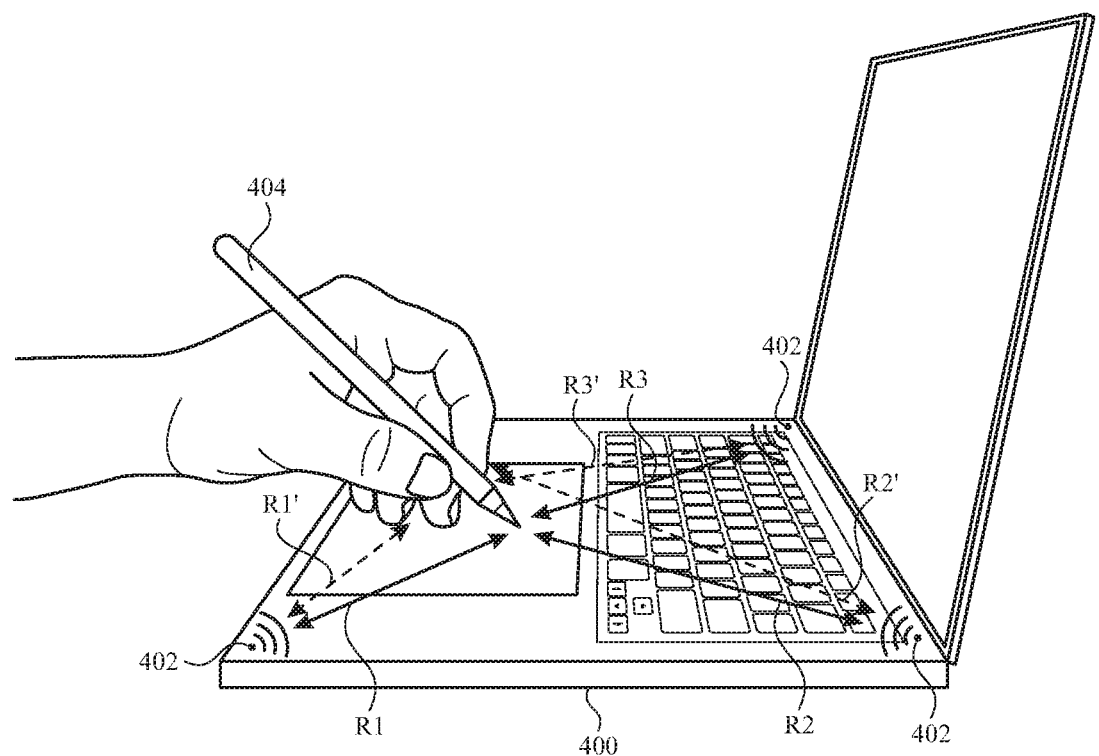
FIG. 4 illustrates a laptop computer utilized within a radar-based object tracking system according to examples of the disclosure.

FIG. 4 illustrates laptop computer 400 utilized within a radar-based object tracking system according to examples of the disclosure. In the example of FIG. 4, laptop computer 400 includes three radars 402, and stylus 404 is positioned on a surface of the laptop. To track the position of stylus 404, each radar 402 can transmit a signal at a certain frequency and measure its distance to the tip of the stylus (e.g., R1, R2 and R3, respectively) using reflections from the stylus tip. Triangulation algorithms (e.g., systems of equations) can then be applied to the measured distances to determine the location of the stylus tip. However, each radar 402 will also detect reflections from other objects, such as reflections from the user's hand, which can cause other distances to be computed (e.g., R1', R2' and R3', respectively). These undesired reflections should be minimized to obtain optimum distance measurements, and ultimately accurate position and movement determinations.

To disambiguate reflections from the object of interest and reflections from undesired objects, some examples of the disclosure employ a transponder with a delay element within the object of interest. By delaying the signal returned from the object of interest a certain amount of time, the returned signal can be separated in time from reflections from undesired objects. Although a reflection from the object of interest can occur in addition to reflections from undesired objects, the reflection from the object of interest can be treated like a reflection from an undesired object, and can be disambiguated and ignored in favor of the desired delayed signal returned from the object of interest. By the time the desired delayed return signal is finally received, the non-delayed undesired reflections can be separated enough in time to make disambiguation possible. For example, if the true distance from a radar to stylus tip is 0.5 m and the return signal from the stylus tip is delayed by a time equivalent to 10 m, the delayed return signal will be stronger than the undesired reflection from undesired objects at 10 m distance by 40*log(10 m/0.5 m)=52 dB. In general, in some examples of the disclosure, the delay can be chosen such that the signal-to-noise ratio (SNR) of the desired delayed return signal to undesired reflections is greater than or equal to a predetermined (and in some examples selectable) value. Additionally, generating the desired return signal from the object of interest can allow the return signal to be amplified without amplifying noise from undesired reflections. The amplification can be useful as the amplitude of received signal may be relatively small due to path loss.

Other examples of the disclosure employ a transponder within the object of interest that matches and identifies a predefined signal received from a radar, and transmits a unique return signal back to the radar. The radar then matches and identifies the unique return signal from the object of interest, and correlates the return signal to filter out undesired reflections. The return signal can be used to calculate a distance between the object of interest and the radar, which can then be used with distance measurements from other radars to perform object tracking.

In some examples, radar location on the device can be selected to maximize the ability of the collection of radars to detect one or more objects of interest in two or three dimensions. For example, if the object of interest is to be detected only two-dimensionally on a surface of the device, two radars may be employed on that surface, although more than two radar can also be used. In some examples, if the object of interest is to be detected three-dimensionally in space above the surface of the device, three radars or more may be employed on that surface. In some examples, if one or more objects of interest are to be detected three-dimensionally in space outside of the device, multiple radars may be employed at different positions on the device to maximize the ability of those radars to detect the objects of interest.

Figure 5:
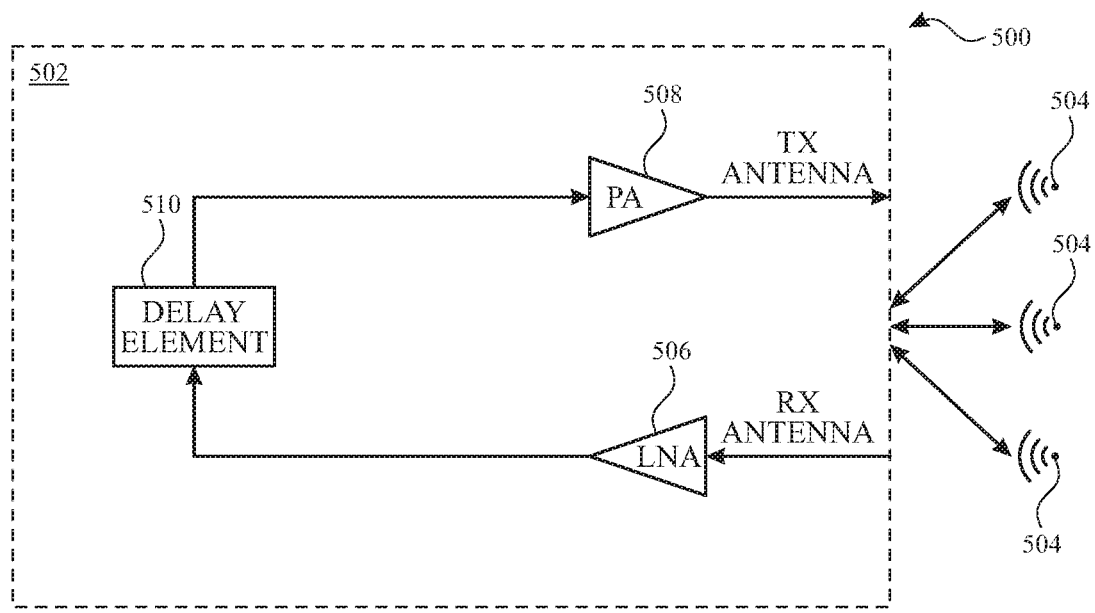
FIG. 5 illustrates a radar-based object tracking system including an object of interest that contains a transponder with a delay element capable of creating an effective time delay, and a plurality of radars according to examples of the disclosure.

FIG. 5 illustrates a radar-based object tracking system 500 including an object of interest 502 (e.g., a stylus) that contains a transponder with delay element 510 capable of creating an effective or actual time delay, and a plurality of radars 504 according to examples of the disclosure. In the example of FIG. 5, the transponder also includes low noise amplifier (LNA) 506 that receives an FM signal from one of the radars 504 via a receive (Rx) antenna, and power amplifier (PA) 508 that receives a signal that is effectively or actually time delayed, and transmits a delayed return signal back to the radar via a transmit (Tx) antenna. In some examples, radars 504 can transmit FM (not continuous wave) signals, in some instances as pulsed waveforms. In other examples, radars 504 can transmit FMCW signals. Between LNA 506 and PA 508 is delay element 510. Delay element 510 can result in the received FM signal being transmitted back to radar 504 with an effective time delay (e.g., a frequency shift or offset that is representative of the desired time delay) or an actual time delay. In the example of FIG. 5 (and all other transponder examples disclosed herein), the transponder can be located at or near a specific point of interest within the object of interest (e.g., a tip of a stylus) where accurate determination of object position or movement is most important. The Tx and Rx antennas can be separate electrodes located at or near the specific point of interest, and in other examples, the Tx and Rx antennas can share an electrode located at or near the specific point of interest. At radar 504, a frequency difference between the delayed FM return signal received from object of interest 502 and an outgoing FM signal can be measured. Because the slope of the FM signal is known, the frequency difference and the slope can be used to compute the total time delay, and from the total time delay the distance from the radar 504 to object of interest 502 can be determined.

Figure 6:
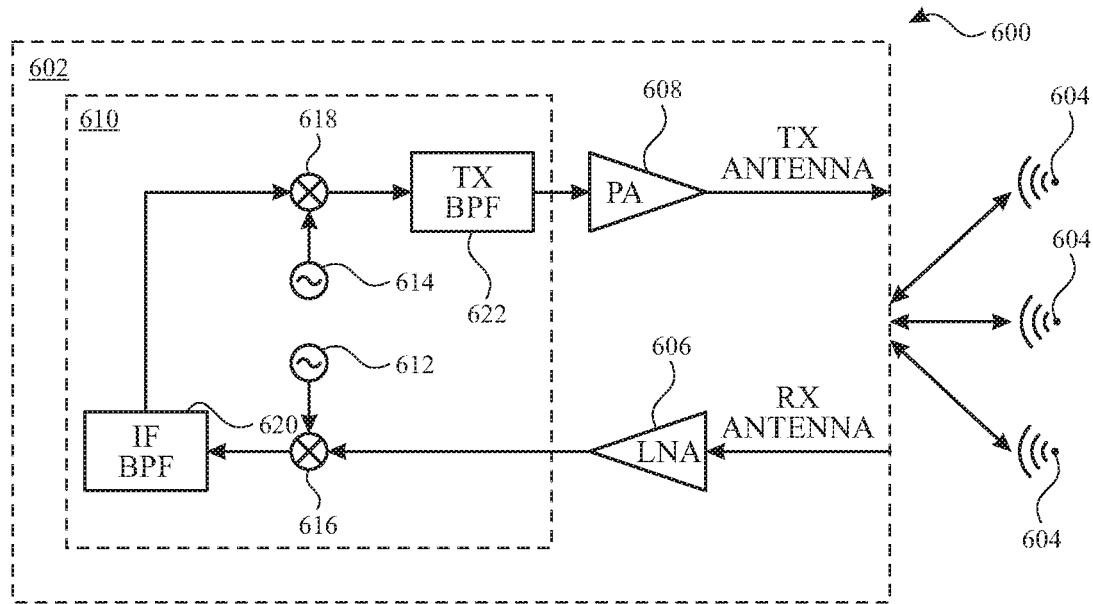
FIG. 6 illustrates a radar-based object tracking system including an object of interest that contains a transponder with a delay element capable of creating an effective time delay, and a plurality of radars according to examples of the disclosure.

FIG. 6 illustrates a radar-based object tracking system 600 including an object of interest 602 (e.g., a stylus) that contains a transponder with delay element 610 capable of creating an effective time delay, and a plurality of radars 604 according to examples of the disclosure. In the example of FIG. 6, the transponder also includes LNA 606 that receives a FMCW signal from one of the radars 604 via Rx antenna, and PA 608 that receives a frequency-shifted signal from delay element 610 and transmits a delayed return signal back to the radar via Tx antenna. Between LNA 606 and PA 608 is delay element 610. Delay element 610 can utilize two PLLs or frequency sources 612, 614 at different frequencies, where the frequency difference is equal to the desired frequency shift or offset that is representative of the desired time delay. Mixer 616 can downconvert the received radar signal at LNA 606 to an intermediate frequency (IF) using frequency source 612, and IF bandpass filter (BPF) 620 can filter the downconverted IF signal. This IF signal can be upconverted using mixer 618 and frequency source 614, filtered by Tx BPF 622, and transmitted back to radar 604 via PA 608 as a delayed return signal. Delay element 610 can therefore result in the received FMCW signal being transmitted back to radar 604 with a frequency offset that is representative of the desired time delay. At radar 604, a frequency difference between the delayed FMCW signal received from object of interest 602 and an outgoing FMCW signal can be measured. In examples that employ FMCW, because the slope of the FMCW signal is known, the frequency difference and the slope can be used to compute the total time delay, and from the total time delay the distance from the radar 604 to object of interest 602 can be determined.

In one example, a 60 GHz radar can transmit an FMCW signal having a slope of 200 MHz/μsec, and a delay associated with a distance of 10 m is desired. The round-trip time of flight can be computed as (10 m*2)/3e8=67 ns. With an FMCW signal slope of −200 MHz/μsec, the beat frequency for the distance of 10 m is 200 MHz/μsec*67 nsec=13.4 MHz. If an IF of 15 GHz is desired, frequency source 612 can generate a frequency of 45 GHz to downconvert the received signal, and frequency source 614 can generate a frequency of 45 GHz−0.0134 GHz=44.9866 GHz to upconvert the IF signal with a carrier shift of −13.4 MHz, effectively delaying the FMCW signal by 67 ns. As a result, the frequency of the return signal sent back to the radar will be 60 GHz−0.0134 GHz=59.9866 GHz.

Figure 7:
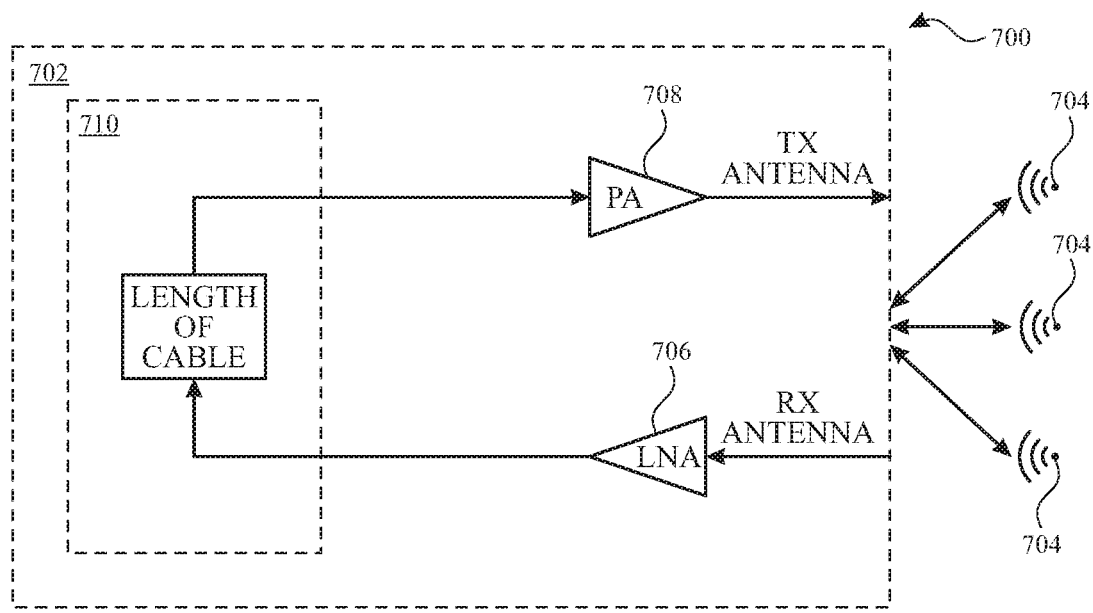
FIG. 7 illustrates a radar-based object tracking system including an object of interest that contains a transponder with a delay element capable of creating an actual time delay, and a plurality of radars according to examples of the disclosure.

FIG. 7 illustrates a radar-based object tracking system 700 including an object of interest 702 (e.g., a stylus) that contains a transponder with delay element 710 capable of creating an actual time delay, and a plurality of radars 704 according to examples of the disclosure. (As noted above, the term "transponder" as defined herein includes a "repeater.") In the example of FIG. 7, the transponder also includes LNA 706 that receives an FM signal from one of the radars 704 via Rx antenna, and PA 708 that receives a signal that is actually time delayed, and transmits a delayed return signal back to the radar via Tx antenna. Between LNA 706 and PA 708 is delay element 710, which is this example can be an actual time delay created by an electrical length of a cable (although in other examples, the actual delay can be created by elements other than the electrical length of the cable, such as mmWave delay elements). The electrical length of the cable can result in the received FM signal being transmitted back to radar 704 with the desired time delay. In some examples, a cable electrical length can be used that is sufficient to create enough time delay to disambiguate the desired return signal from undesired reflections under all expected conditions. In some examples, this cable electrical length can be 10-50 meters. In some examples, for sub-6 GHz frequencies, ceramic coaxial line elements with dielectric constants of up to 9000 at the lengths of several centimeters can introduce an electrical delay of several meters. In another example, for sub-6 GHz frequencies, ceramic coaxial line elements with dielectric constants of up to 9000 at the physical length of one centimeter can introduce an electrical delay of about 95 cm. At radar 704, a frequency difference between the delayed FM signal received from object of interest 702 and an outgoing FM signal can be measured. Because the slope of the FM signal is known, the frequency difference and the slope can be used to compute the total time delay, and from the total time delay the distance from the radar 704 to object of interest 702 can be determined.

In one example, a 60 GHz radar can transmit an FMCW signal having a slope of 200 MHz/μsec, and a delay associated with a distance of 10 m is desired. The round-trip time of flight can be computed as (10 m*2)/3e8=67 ns. With an FMCW signal slope of 200 MHz/μsec, the beat frequency for the distance of 10 m is 200 MHz/μsec*67 nsec=13.4 MHz. Therefore, a 20 m cable can be applied to the FMCW signal received at the object of interest, effectively delaying the FMCW signal by 67 ns. As a result, the radar will interpret the delay as a beat wavelength with the 13.4 MHz frequency.

Figure 8:
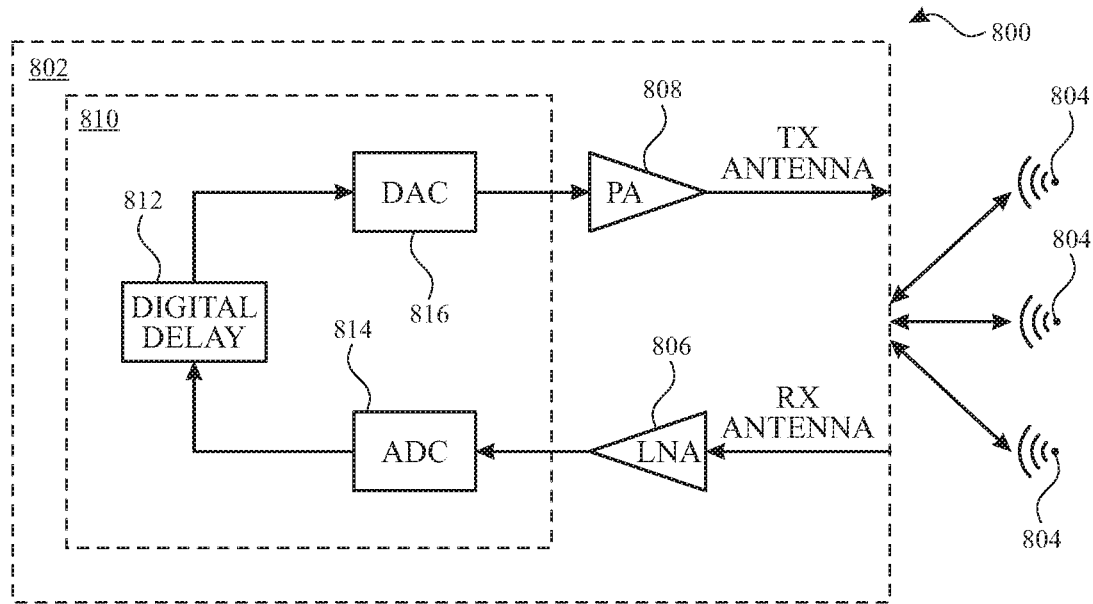
FIG. 8 illustrates a radar-based object tracking system including an object of interest that contains a transponder with a delay element capable of creating an actual time delay, and a plurality of radars according to examples of the disclosure.

FIG. 8 illustrates a radar-based object tracking system 800 including an object of interest 802 (e.g., a stylus) that contains a transponder with delay element 810 capable of creating an actual time delay, and a plurality of radars 804 according to examples of the disclosure. In the example of FIG. 8, the transponder also includes LNA 806 that receives an FM signal from one of the radars 804 via Rx antenna, and PA 808 that receives a signal from the LNA that is actually time delayed and transmits a delayed return signal back to the radar via Tx antenna. Between LNA 806 and PA 808 is delay element 810, which is this example is digital delay 812. ADC 814 can be used to convert the received signal from LNA 806 to digital signals, which can then be delayed in digital delay 812. In some examples, ADC 814 can include the full RF chain from LNA 806 output to the digital input of digital delay 812. In some examples, ADC 814 can be implemented as a single element or as a part or combination of heterodyne, super-heterodyne or zero-IF architectures. In some examples, digital delay 812 can be buffered digital logic, a lookup table, and the like. Digital delay 812 can be converted back to analog signals using DAC 816, resulting in the received FM signal being transmitted back to radar 804 with the desired actual time delay. In some examples, DAC 816 can include the full RF chain from the digital output of digital delay 812 to the analog input to PA 808. In some examples, DAC 816 can be implemented as a single element or as a part or combination of heterodyne, super-heterodyne or zero-IF architectures. At radar 804, a frequency difference between the delayed FM return signal received from object of interest 802 and an outgoing FM signal can be measured. Because the slope of the FM signal is known, the frequency difference and the slope can be used to compute the total time delay, and from the total time delay the distance from the radar 804 to object of interest 802 can be determined.

Figure 9:
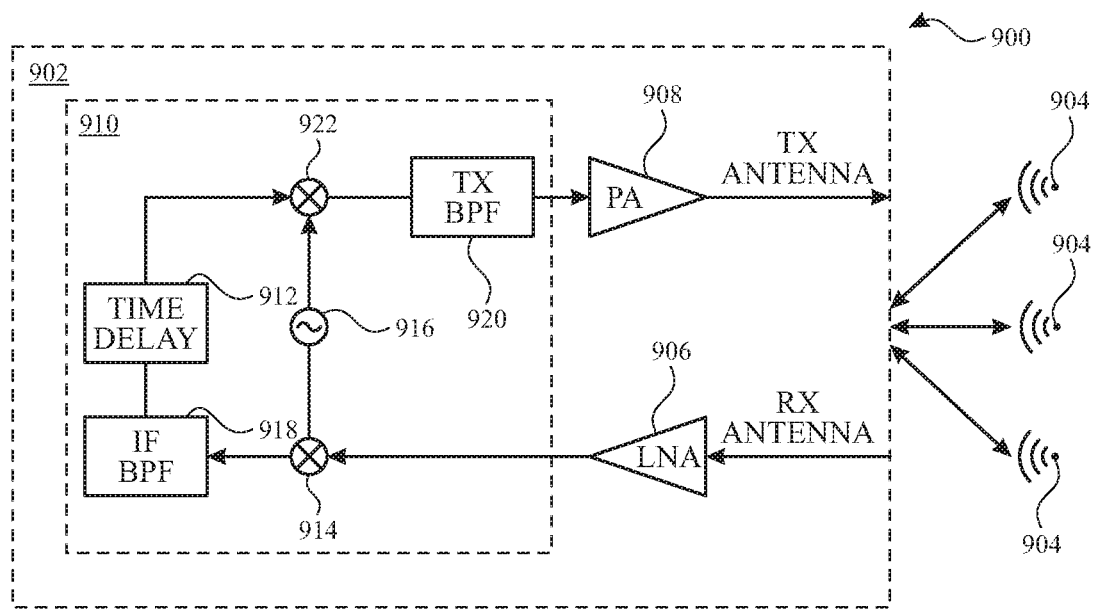
FIG. 9 illustrates a radar-based object tracking system including an object of interest that contains a transponder with delay element capable of creating an effective time delay, and a plurality of radars according to examples of the disclosure.

In one example, a 60 GHz radar can transmit an FMCW signal having a slope of 200 MHz/μsec, and a delay associated with a distance of 10 m is desired. The round-trip time of flight can be computed as (10 m*2)/3e8=67 ns. Assuming a digital sampling rate of 5 GHz (or 5 giga-samples per second (GSps)), a digital delay of 67 ns*(⅕ GHz)≈333 samples can be applied. Therefore, a digital delay of 333 samples can be applied to the FMCW signal received at the object of interest, delaying the FMCW signal by 67 ns. With an FMCW signal slope of 200 MHz/µsec, the beat frequency for the distance of 10 m is 200 MHz/µsec*67 nsec=13.4 MHz. As a result, the radar will interpret the delay as a beat wavelength with the 13.4 MHz frequency FIG. 9 illustrates a radar-based object tracking system 900 including an object of interest 902 (e.g., a stylus) that contains a transponder with delay element 910 capable of creating a time delay, and a plurality of radars 904 according to examples of the disclosure. In the example of FIG. 9, the transponder also includes LNA 906 that receives an FM signal from one of the radars 904 via Rx antenna, and PA 908 that receives a signal from the LNA that is time delayed and transmits a delayed return signal back to the radar via Tx antenna. Between LNA 906 and PA 908 is delay element 910, which is this example can include either an electrical length of a cable or a digital delay as discussed above (represented generally by time delay block 912), applied to the signal received at the object of interest at IF. Mixer 914 and frequency source 916 can be used to downconvert the received RF signal to IF, and the downconverted signal can be filtered using IF BPF 918. In some examples, IF BPF 918 can induce the required delay and eliminate the need for dedicated time delay block 912. In other example where time delay block 912 is required, after the IF signal is time delayed at 912, mixer 922 and frequency source 916 can upconvert the IF signal to an RF signal, which can be filtered by Tx BPF 920 before being transmitted back to radar 904 using PA 908 with the desired time delay. At radar 904, a frequency difference between the delayed FM signal received from object of interest 902 and an outgoing FM signal can be measured. Because the slope of the FM signal is known, the frequency difference and the slope can be used to compute the total time delay, and from the total time delay the distance from the radar 904 to object of interest 902 can be determined.

In some of the examples presented above, the delay element can be configurable based on the environment. For example, one or more radars can detect the distance of walls and other surrounding objects to determine the size of the environment. In some examples, at the time of pairing an object of interest with a device, each object of interest can receive programming information so that it can operate with a particular effective delay suitable for the detected environment.

As noted above, in some examples of the disclosure, multiple radars can be used to detect the distance between those radars and the object of interest. To enable multiple radars to communicate with an object of interest, in some examples each of the radars in a device can be controlled (for example by radar controller 206 in FIG. 2) to transmit, receive and measure R1, R2 and R3 at different times. In some examples, rather than operating sequentially, each of the radars can transmit and receive orthogonal signals, and circuitry within the object of interest can be configured to sequentially receive, process and transmit those orthogonal signals so that the plurality of radars can communicate with the object of interest at the same time.

As noted above, in some examples of the disclosure, multiple objects of interest can be detected by the radars in a device to enable collaborative activities. To enable communication of multiple objects of interest with a device, in some examples the delay element in each of the objects of interest can be programmed with a unique effective delay. For example, a first object of interest can generate an effective delay of 100 m, and a second object of interest can generate an effective delay of 200 m. In some examples, at the time of pairing an object of interest with a device, each object of interest can receive programming information into transponder control logic so that it can operate with its own unique effective delay as compared to other objects of interest paired with the device. In the examples described above, the frequency sources can be programmed to operate at different frequencies or the digital delays can be programmed to generate different effective delays. The radars can then look for those frequencies being transmitted back from the multiple object of interests, without the need to sequence the operation of the radars.

Figure 10:
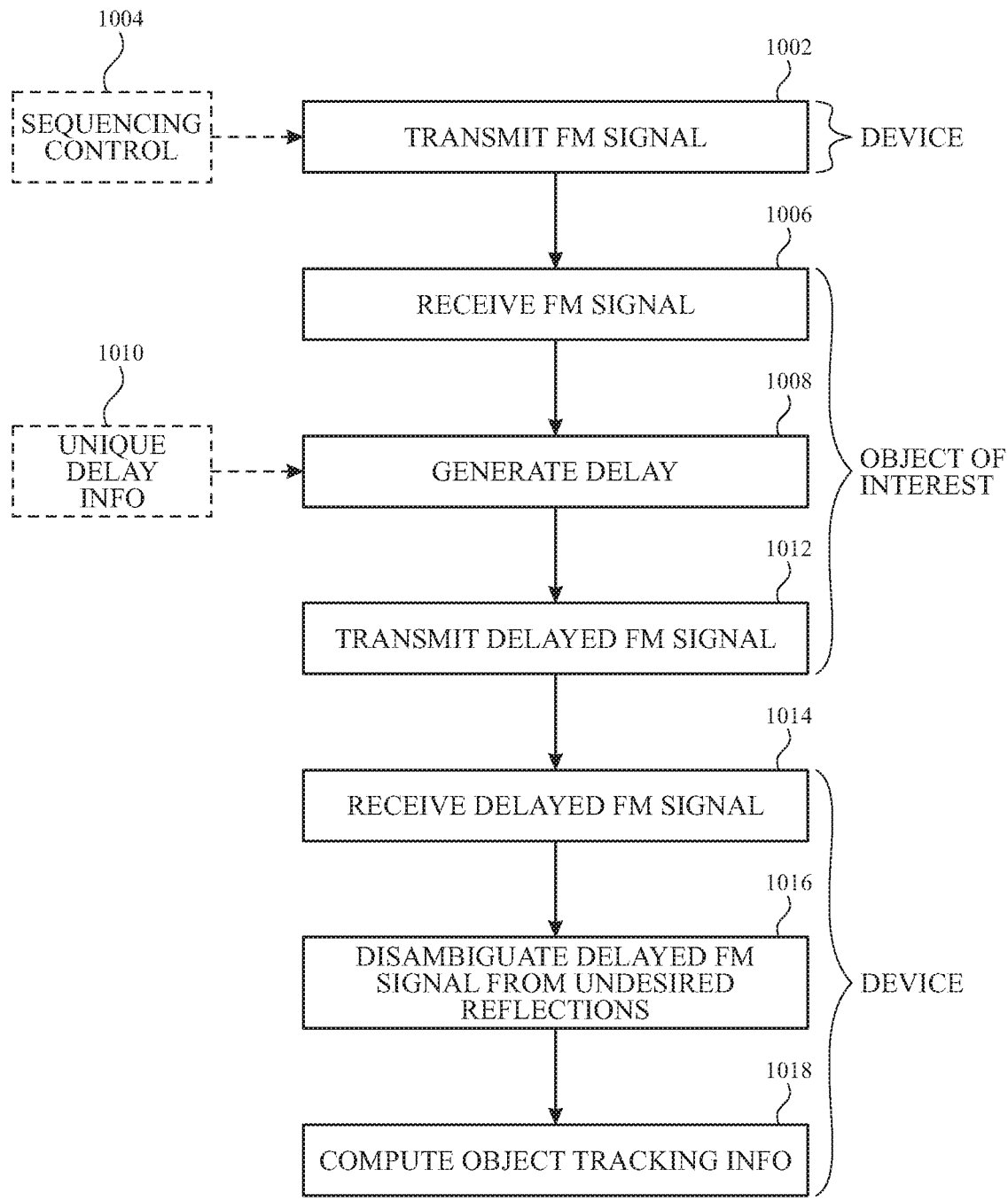
FIG. 10 illustrates a process for high accuracy object tracking according to examples of the disclosure.

FIG. 10 illustrates a process 1000 for high accuracy object tracking according to examples of the disclosure. At 1002, a plurality of radars at a device can transmit an FM signal. In some examples, at 1004 the plurality of radars can optionally be subject to sequencing control to adjust the timing of the transmitted FM signal. At 1006, one or more objects of interest can receive the FM signal. At 1008, the received FM signal can be delayed with a delay element, which can effectively or actually delay the received FM signal. In some examples, at 1010, the object of interest can optionally receive delay information to enable each object of interest to generate a unique delay. At 1012, the delayed FM return signal can be transmitted from the object of interest. At 1014, the plurality of radars can receive the delayed FM return signal. At 1016, the device can use the delayed FM return signal received at the plurality of radars to disambiguate that signal from unwanted reflections and extract multiple ranges of the object of interest to each of the plurality of radars. At 1018, these ranges can be combined in triangulation or other processing to compute 2D or 3D object tracking information such as the location of the object of interest in 2D or 3D.

Figure 11:
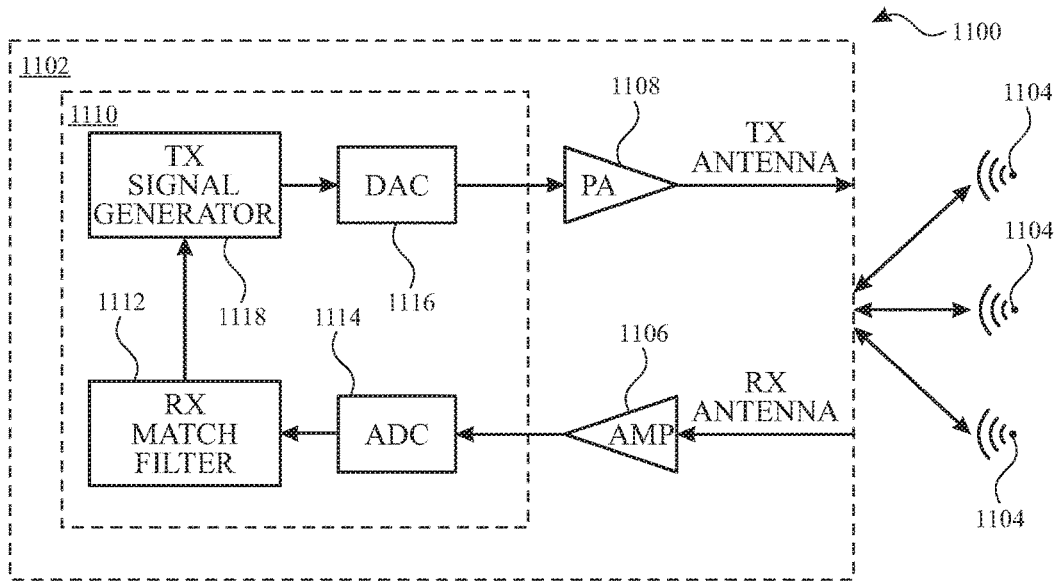
FIG. 11 illustrates a radar-based object tracking system including an object of interest that contains a transponder capable of receiving a predefined transmit signal from a radar and transmitting a unique return signal according to examples of the disclosure.

FIG. 11 illustrates a radar-based object tracking system 1100 including an object of interest 1102 (e.g., a stylus) that contains a transponder 1110 capable of receiving a predefined transmit signal from a radar 1104 and transmitting a unique return signal according to examples of the disclosure. In the example of FIG. 11, object of interest 1102 includes amplifier 1106 that receives the predefined transmit signal from one of the radars 804 via Rx antenna, and after amplification at amplifier 1106, is converted to a digital signal at ADC 1114. In some examples, ADC 1114 can be implemented as a single element or as a part or combination of heterodyne, super-heterodyne or zero-IF architectures. In some examples, ADC 1114 can include the full RF chain from amplifier 1106 to the digital input of receive match filter 1112. Transponder 1110 then attempts to match the received predefined signal to a known predefined signal using received match filter 1112. If a match is found, match filter 1112 triggers transmit signal generator 1118 to generate a unique return signal, which is then converted to an analog signal in DAC 1116 and then transmitted back to radars 1104 via PA 1108. In some examples, transmit signal generator 1118 generates the unique return signal based on certain parameters stored in memory (not shown), and in other examples, the transmit signal generator retrieves a unique return signal stored in memory (not shown). In some examples, DAC 1116 can include the full RF chain from the digital output of transmit signal generator 1118 to the analog input to PA 1108. In some examples, DAC 1116 can be implemented as a single element or as a part or combination of heterodyne, super-heterodyne or zero-IF architectures.

Radar 1104 then attempts to match the received unique return signal to a known stored return signal using a match filter. If a match is found, radar 1104 can perform range compression processing. In some examples, range compression processing can determine the distance between the object of interest and the radar based on the delay difference between the transmission time of the predefined transmit signal and the receipt time of the unique return signal. Note that the predefined transmit signal generated by the radar and the unique return signal received by the radar can be different signals (with a correlation between the two being as low as possible), because the predefined transmit signal need only be recognized by the transponder so that the unique return signal can be sent back to the radar. In some examples, the predefined transmit signal and the unique return signal can be linear frequency modulated (LFM) signals (i.e., chirps) with different frequency slopes or different carrier frequencies. In some examples, the predefined transmit signal and the unique return signal can be orthogonal signals such that when the radar receives the sum of the unique return signal and all of the echoes of the predefined transmit signal from the environment (clutter), the results of the correlation being performed at the radar will yield only a single meaningful correlation.

Figure 12:
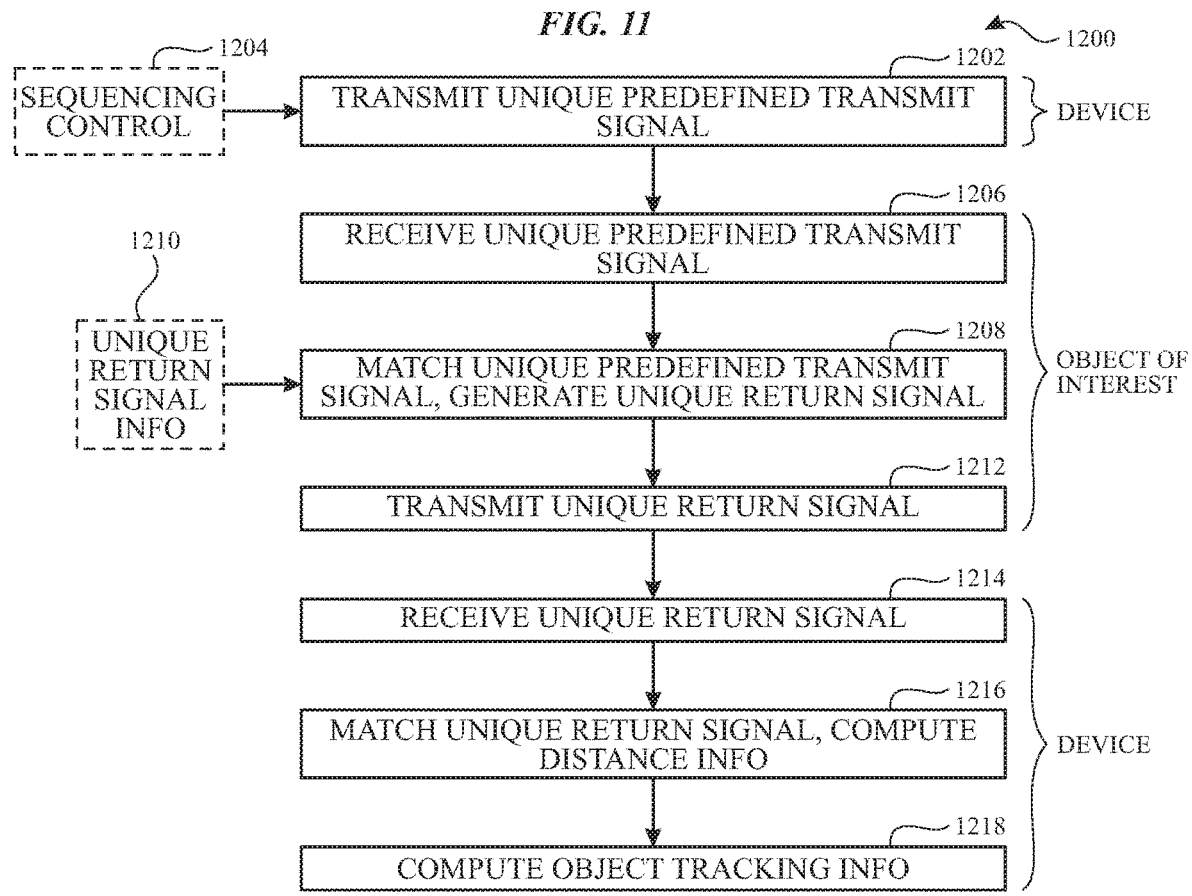
FIG. 12 illustrates a process for high accuracy object tracking according to examples of the disclosure.

FIG. 12 illustrates a process 1200 for high accuracy object tracking according to examples of the disclosure. At 1202, each of a plurality of radars at a device can transmit a unique predefined transmit signal. In some examples, at 1204 the plurality of radars can optionally be subject to sequencing control to adjust the timing of the transmitted unique predefined transmit signal. At 1206, one or more objects of interest can receive the unique predefined transmit signal. At 1208, the received unique predefined transmit signal can be matched at the object of interest, and if a match is found, a unique return signal can be generated. In some examples, at 1210, the object of interest can optionally receive return signal information to enable each objects of interest to generate a unique return signal. At 1212, the unique return signal can be transmitted from the object of interest. At 1214, the plurality of radars can receive the unique return signal. At 1216, the received unique return signal can be matched at the radar, and if a match is found, a range or distance between the object of interest and the radar can be determined. At 1218, the ranges from multiple radars can be combined in triangulation or other processing to compute 2D or 3D object tracking information such as the location of the object of interest in 2D or 3D.

The radar-based object tracking systems presented above can provide various advantages. For example, unlike camera-based object tracking systems, radar-based object tracking systems can be unaffected by environmental conditions such as bright light, and unlike cameras, mmWave frequencies such as 60 GHz frequencies are largely unaffected (i.e., experience insignificant signal attenuation) when passing through materials such as plastic and some metals, which allows the radar transponders to be hidden within the object of interest (e.g., hidden within a stylus) without the need for a window or glass. In addition, cameras have a limited field of view, are relatively higher power and larger in size, and can create privacy issues. Furthermore, unlike conventional mmWave frequency radar systems, the addition of the transponder with the delay element to the object of interest allows the radar system to separate and disambiguate desired return signals from undesired reflections, which can lead to more accurate distance determinations, more accurate triangulation, and ultimately more accurate object tracking. The return signal can also be amplified without amplifying noise from undesired reflections. The amplification can be useful as the amplitude of received signal may be relatively small due to attenuation.

Therefore, according to the above, some examples of the disclosure are directed to a transponder for generating a predetermined delay of a first signal received at an object of interest in a radar-based object tracking system. The transponder comprises a receive amplifier configured for receiving the first signal transmitted from a first radar; a delay element configured for delaying the received first signal by a predetermined time delay; and a transmit amplifier configured for transmitting a delayed first signal back to the first radar. Additionally or alternatively to one or more of the examples disclosed above, in some examples the first signal is a frequency-modulated continuous wave (FMCW) signal. Additionally or alternatively to one or more of the examples disclosed above, in some examples the delay element comprises a downconverter and an upconverter configured to operate with a frequency difference that is a function of the predetermined time delay. Additionally or alternatively to one or more of the examples disclosed above, in some examples the downconverter comprises a first mixer and a first frequency source, and the upconverter comprises a second mixer and a second frequency source; and the first frequency source and the second frequency source operate with the frequency difference. Additionally or alternatively to one or more of the examples disclosed above, in some examples the delay element comprises: a downconverter configured to downconvert the received first signal to an intermediate frequency using a first frequency source; a time delay apparatus for delaying the downconverted first signal by the predetermined time delay at the intermediate frequency; and an upconverter configured to upconvert the delayed first signal using the first frequency source. Additionally or alternatively to one or more of the examples disclosed above, in some examples the time delay apparatus comprises an electrical length of a cable. Additionally or alternatively to one or more of the examples disclosed above, in some examples the time delay apparatus comprises a digital delay. Additionally or alternatively to one or more of the examples disclosed above, in some examples the delay element comprises a digital delay configured to produce the predetermined time delay. Additionally or alternatively to one or more of the examples disclosed above, in some examples the transponder further comprises transponder control logic configured for receiving unique delay information and programming the delay element to change the predetermined time delay. Additionally or alternatively to one or more of the examples disclosed above, in some examples the delay element comprises an electrical length of a cable configured to generate the predetermined time delay.

Some examples of the disclosure are directed to a method for generating a predetermined delay of a first signal received at an object of interest in a radar-based object tracking system. The method comprises receiving the first signal transmitted from a first radar; delaying the received first signal by a predetermined time delay; and transmitting a delayed first signal back to the first radar. Additionally or alternatively to one or more of the examples disclosed above, in some examples the first signal is a frequency-modulated continuous wave (FMCW) signal. Additionally or alternatively to one or more of the examples disclosed above, in some examples the method further comprises downconverting and then upconverting the received first signal with a frequency difference that is a function of the predetermined time delay. Additionally or alternatively to one or more of the examples disclosed above, in some examples downconverting comprises mixing the received first signal with a first frequency source; upconverting comprises mixing the downconverted first signal with a second frequency source; and the first frequency source and the second frequency source operate with the frequency difference. Additionally or alternatively to one or more of the examples disclosed above, in some examples the method further comprises downconverting the received first signal to an intermediate frequency using a first frequency source; delaying the downconverted first signal by the predetermined time delay at the intermediate frequency; and upconverting the delayed first signal using the first frequency source. Additionally or alternatively to one or more of the examples disclosed above, in some examples the method further comprises delaying the downconverted first signal by the predetermined time delay at the intermediate frequency using an electrical length of a cable. Additionally or alternatively to one or more of the examples disclosed above, in some examples the method further comprises delaying the downconverted first signal by the predetermined time delay at the intermediate frequency using a digital delay configured to produce the predetermined time delay. Additionally or alternatively to one or more of the examples disclosed above, in some examples the method further comprises delaying the received first signal using a digital delay configured to produce the predetermined time delay. Additionally or alternatively to one or more of the examples disclosed above, in some examples the method further comprises receiving unique delay information and changing the predetermined time delay. Additionally or alternatively to one or more of the examples disclosed above, in some examples the method further comprises delaying the received first signal using an electrical length of a cable configured to generate the predetermined time delay.

Some examples of the disclosure are directed to a radar-based object tracking system for detecting an object of interest. The system comprises a device including a first radar configured for transmitting a first frequency-modulated (FM) signal; and an object of interest configured for receiving the first FM signal from the first radar, generating effective predetermined delay in the received first FM signal, and transmitting the delayed first FM signal; wherein the first radar is further configured for receiving the delayed first FM signal from the object of interest; and wherein the device is configured for disambiguating the delayed first FM signal from reflections of the first FM signal transmitted from the first radar, and determining a distance from the device to the object of interest using the delayed first FM signal. Additionally or alternatively to one or more of the examples disclosed above, in some examples the object of interest is further configured for generating the delay by downconverting and upconverting the received first FM signal with a frequency difference that is a function of the predetermined time delay. Additionally or alternatively to one or more of the examples disclosed above, in some examples the object of interest is further configured for generating the delay by downconverting the received first FM signal to an intermediate frequency using a first frequency source; delaying the downconverted first FM signal by the predetermined time delay at the intermediate frequency; and upconverting the delayed first FM signal using the first frequency source. Additionally or alternatively to one or more of the examples disclosed above, in some examples the object of interest is further configured for delaying the downconverted first FM signal by the predetermined time delay at the intermediate frequency using an electrical length of a cable. Additionally or alternatively to one or more of the examples disclosed above, in some examples the object of interest is further configured for delaying the downconverted first FM signal by the predetermined time delay at the intermediate frequency using a digital delay configured to produce the predetermined time delay.

Some examples of the disclosure are directed to a transponder for generating a return signal from an object of interest in a radar-based object tracking system. The transponder comprises a receive amplifier configured for receiving a first predefined signal; a match filter configured for matching the received first predefined signal to a known predefined signal; a transmit signal generator configured for generating a unique return signal when a match with the received first predefined signal is found; and a transmit amplifier configured for transmitting the unique return signal. Additionally or alternatively to one or more of the examples disclosed above, in some examples the transmit signal generator is further configured for generating the unique return signal based on stored parameters. Additionally or alternatively to one or more of the examples disclosed above, in some examples the transmit signal generator is further configured for generating the unique return signal from a stored return signal. Additionally or alternatively to one or more of the examples disclosed above, in some examples the first predefined signal and the unique return signal are orthogonal. Additionally or alternatively to one or more of the examples disclosed above, in some examples the first predefined signal and the unique return signal are linear frequency modulated (LFM) signals.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A transponder for generating a predetermined delay of a first signal received at an object of interest in a radar-based object tracking system, the transponder comprising:
   a receive antenna;
   a receive amplifier configured for receiving, via the receive antenna, the first signal transmitted from a first radar;
   a delay element configured for delaying the received first signal by a predetermined time delay;
   a downconverter configured for mixing the received first signal with a first frequency source that operates with a frequency difference, wherein the frequency difference is a function of the predetermined time delay;
   an upconverter configured for mixing the downconverted first signal with a second frequency source that operates with the frequency difference;
   a transmit antenna; and
   a transmit amplifier configured for transmitting, via the transmit antenna, a delayed first signal back to the first radar.

2. The transponder of claim 1, wherein the first signal is a frequency-modulated continuous wave (FMCW) signal.

3. The transponder of claim 1, wherein the downconverter comprises a first mixer and the upconverter comprises a second mixer, downconverting comprises mixing, using the first mixer, the received first signal with the first frequency source, and upconverting comprises mixing, using the second mixer, the downconverted first signal with the second frequency source.

4. The transponder of claim 1, wherein:
the downconverter is configured to downconvert the received first signal to an intermediate frequency using the first frequency source;
the delay element comprises a time delay apparatus for delaying the downconverted first signal by the predetermined time delay at the intermediate frequency; and
the upconverter is configured to upconvert the delayed first signal using the first frequency source.

5. The transponder of claim 4, wherein the time delay apparatus comprises an electrical length of a cable.

6. The transponder of claim 4, wherein the time delay apparatus comprises a digital delay.

7. The transponder of claim 1, wherein the delay element comprises a digital delay configured to produce the predetermined time delay.

8. The transponder of claim 1, further comprising transponder control logic configured for receiving unique delay information and programming the delay element to change the predetermined time delay.

9. The transponder of claim 1, wherein the delay element comprises an electrical length of a cable configured to generate the predetermined time delay.

10. The transponder of claim 1, further comprising:
a match filter configured for matching the received first signal to a known predefined signal; and
a transmit signal generator configured for generating a unique return signal when a match with the received first signal is found based on stored parameters.

11. The transponder of claim 1, further comprising:
a match filter configured for matching the received first signal to a known predefined signal; and
a transmit signal generator configured for generating a unique return signal when a match with the received first signal is found from a stored return signal.

12. The transponder of claim 11, wherein the first signal and the unique return signal are orthogonal.

13. The transponder of claim 11, wherein the first signal and the unique return signal are linear frequency modulated (LFM) signals.

14. A method for generating a predetermined delay of a first signal received at an object of interest in a radar-based object tracking system, the method comprising:
receiving the first signal transmitted from a first radar;
delaying the received first signal by a predetermined time delay;
downconverting and then upconverting the received first signal with a frequency difference that is a function of the predetermined time delay; and
transmitting a delayed first signal back to the first radar, wherein:
downconverting comprises mixing the received first signal with a first frequency source;
upconverting comprises mixing the downconverted first signal with a second frequency source; and
the first frequency source and the second frequency source operate with the frequency difference.

15. The method of claim 14, wherein the first signal is a frequency-modulated continuous wave (FMCW) signal.

16. The method of claim 14, the method further comprising:
downconverting the received first signal to an intermediate frequency using a first frequency source;
delaying the downconverted first signal by the predetermined time delay at the intermediate frequency; and
upconverting the delayed first signal using the first frequency source.

17. The method of claim 16, further comprising delaying the downconverted first signal by the predetermined time delay at the intermediate frequency using an electrical length of a cable.

18. The method of claim 16, further comprising delaying the downconverted first signal by the predetermined time delay at the intermediate frequency using a digital delay configured to produce the predetermined time delay.

19. The method of claim 14, further comprising delaying the received first signal using a digital delay configured to produce the predetermined time delay.

20. The method of claim 14, further comprising receiving unique delay information and changing the predetermined time delay.

21. The method of claim 14, further comprising delaying the received first signal using an electrical length of a cable configured to generate the predetermined time delay.

22. A radar-based object tracking system for detecting a stylus having a tip, the system comprising:
a computing device including a first radar configured for transmitting a first frequency-modulated (FM) signal; and
the stylus configured for receiving the first FM signal from the first radar, generating effective predetermined delay in the received first FM signal, and transmitting the delayed first FM signal;
wherein the first radar is further configured for receiving the delayed first FM signal from the stylus; and
wherein the computing device is configured for disambiguating the delayed first FM signal from reflections of the first FM signal transmitted from the first radar, and determining a distance from the computing device to the tip of the stylus using the delayed first FM signal.

23. The system of claim 22, the stylus further configured for generating the effective predetermined delay by downconverting and upconverting the received first FM signal with a frequency difference that is a function of the effective predetermined delay.

24. The system of claim 22, the stylus further configured for:
generating the effective predetermined delay by downconverting the received first FM signal to an intermediate frequency using a first frequency source;
delaying the downconverted first FM signal by the effective predetermined delay at the intermediate frequency; and
upconverting the delayed first FM signal using the first frequency source.

25. The system of claim 24, the stylus further configured for delaying the downconverted first FM signal by the effective predetermined delay at the intermediate frequency using an electrical length of a cable.

26. The system of claim 24, the stylus further configured for delaying the downconverted first FM signal by the effective predetermined delay at the intermediate frequency using a digital delay configured to produce the effective predetermined delay.

* * * * *